United States Patent
Melzer et al.

(10) Patent No.: US 12,424,826 B2
(45) Date of Patent: Sep. 23, 2025

(54) DIN RAIL UNIT FOR MOUNTING ELECTRONIC DEVICES THEREON

(71) Applicant: TQ-Systems GmbH, Seefeld (DE)

(72) Inventors: Raik Melzer, Chemnitz (DE); Daniel Koethe, Chemnitz (DE); Frank Paessler, Chemnitz (DE)

(73) Assignee: TQ-Systems GmbH, Seefeld (DE)

( * ) Notice: Subject to any disclaimer, the term of this patent is extended or adjusted under 35 U.S.C. 154(b) by 245 days.

(21) Appl. No.: 18/225,414

(22) Filed: Jul. 24, 2023

(65) Prior Publication Data
US 2025/0038490 A1  Jan. 30, 2025

(51) Int. Cl.
*H02B 1/052* (2006.01)
*H01F 7/02* (2006.01)
*H02B 1/32* (2006.01)

(52) U.S. Cl.
CPC .............. *H02B 1/052* (2013.01); *H01F 7/02* (2013.01); *H02B 1/32* (2013.01)

(58) Field of Classification Search
CPC .. H02B 1/052; H02B 1/32; H01F 7/02; H01F 7/0252
See application file for complete search history.

(56) References Cited

U.S. PATENT DOCUMENTS

| | | | |
|---|---|---|---|
| 2011/0192857 A1* | 8/2011 | Rothbaum | F16M 11/041 248/220.21 |
| 2015/0255919 A1* | 9/2015 | Yano | H01R 12/91 439/39 |
| 2016/0365184 A1* | 12/2016 | Schein | H01F 7/02 |

FOREIGN PATENT DOCUMENTS

WO    WO-2017072549 A1 *  5/2017

* cited by examiner

*Primary Examiner* — Mohamad A Musleh
(74) *Attorney, Agent, or Firm* — Myers Wolin, LLC

(57) ABSTRACT

A DIN rail unit, such as a top-hat rail unit, includes a plastic base structure including an elongated baseplate and a side mount plate. The elongated baseplate is in a length direction of the baseplate in a first magnetic fixation section with at least one magnet embedded and covered by, e.g., double-sided tape on a back side of the baseplate, a mounting section with flanges extending along a width direction of the baseplate and forming a first top-hat rail configuration for attaching the electronic device in a base mounted orientation on a front side of the baseplate, and a second magnetic fixation section covered by double-sided tape. The side mount plate extends from a long side of the baseplate and provides flanges extending along a normal direction of the baseplate, which form a second DIN rail configuration for having attached thereon the electronic device in a side mounted orientation.

20 Claims, 4 Drawing Sheets

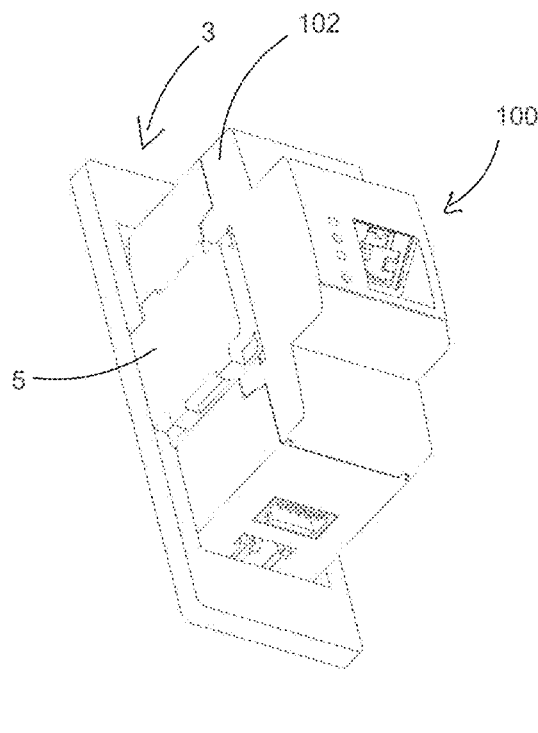
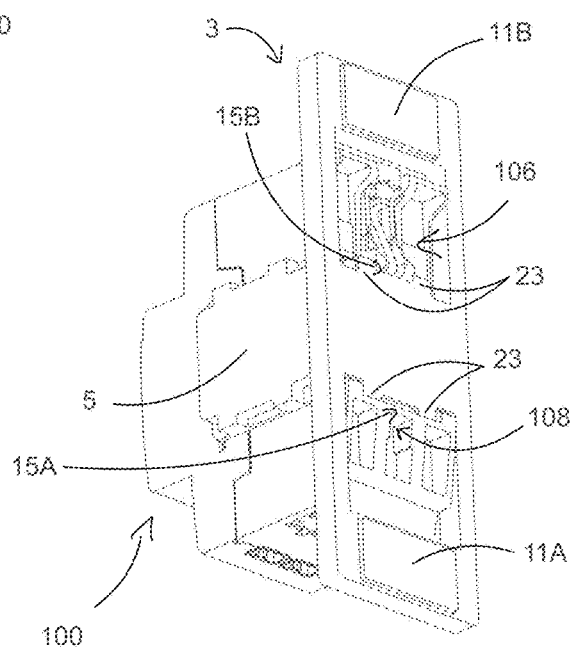
FIG. 3A
FIG. 3B
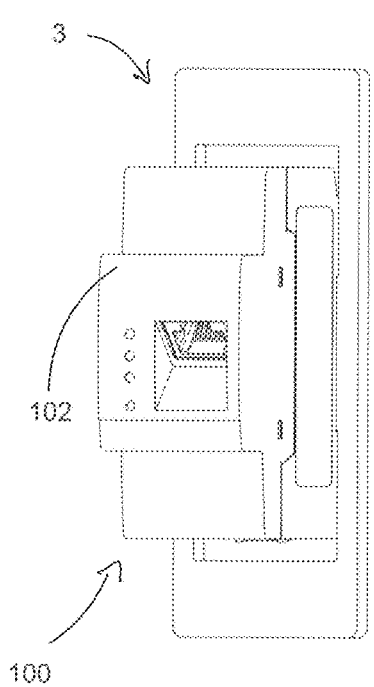
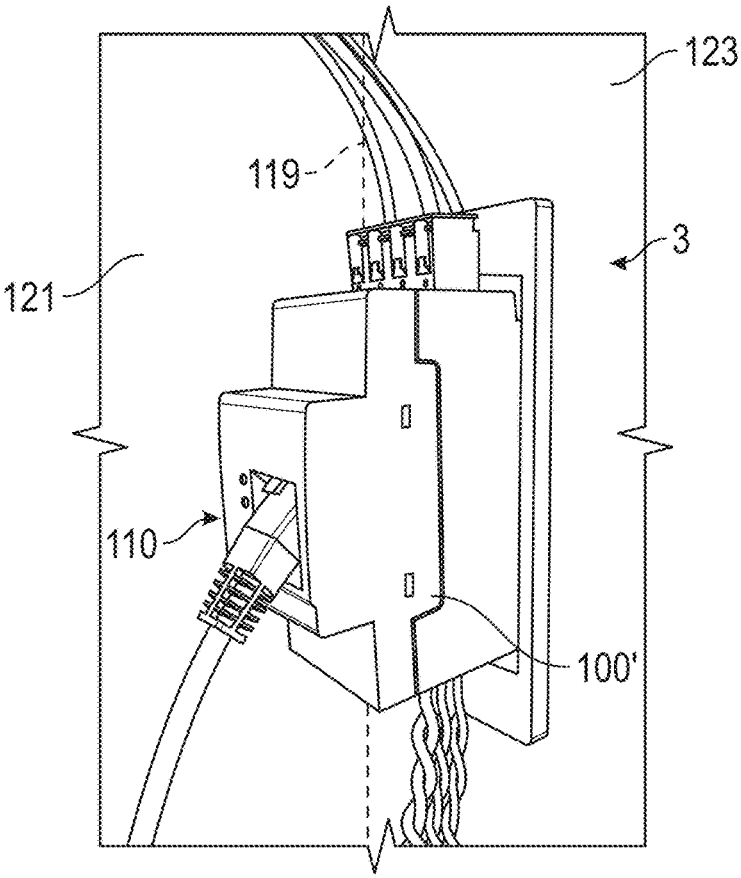
FIG. 3C
FIG. 3D

DIN RAIL UNIT FOR MOUNTING ELECTRONIC DEVICES THEREON

TECHNICAL FIELD

The present disclosure relates generally to mounting techniques such as a top-hat rail configuration, generally a DIN rail configuration, for mounting electrical installation equipment within a sheet metal housing such as a Main Service Panel of an electrical housing installation. More specifically, the present disclosure relates to a DIN rail unit for mounting electronic devices thereon, the DIN rail unit being usable, for example, in electrical installation cabinets made of sheet metal.

BACKGROUND

An electrical installation for residential or business buildings includes inter alia an electrical cabinet that usually provides an electrical enclosure configured for enclosing electrical or electronic equipment in a secure and shielded manner. For example, a meter center (as an example of an electrical cabinet) generally has industrial control equipment units installed therein as well as, for example, switches, knobs, displays as well as circuit breakers. There exist a plurality of types and configurations of electrical cabinets that may or may not including preinstalled mounts structures for mounting those units. An electrical cabinet is usually configured to protect its content from the environment and prevent electrical shock to equipment users. The electrical cabinet may be subject to country specific regulations, for example, it may not be allowed to provide additional openings within its enclosure. While in some countries/regions mounting structures such as snap-on mounting rails are regularly used in an electrical cabinet, in other countries this may not be common. An example for a meter center is the "Siemens MC1224B1125EFC Low Voltage Main Breaker Meter Socket and Load center Combination".

Example of snap-on mounting rails are the normed DIN rails including top-hat rails, C-section rails, and G-section rails as well as miniature top-hat rails according to IEC/EN 60715. DIN rails such as top-hat rails are made of steel sheet and are commonly used, in particular, in Europe for mounting, for example, circuit breakers or generally industrial control equipment units such as energy monitoring units inside an electrical cabinet. The top-hat rail, for example, can have a profile width of 35 mm and a profile depth of 7.5 mm or 15 mm, the miniature top-hat rail a profile width of 15 mm and a profile depth of 5.5 mm); the profile length may extend across the respective cabinet and limit the number of units to be mounted thereon. Similar dimensions are used for C-section rails and G-section rails. The electronic devices may have a predefined module width for being mounted on, e. g., a top hat rail in a structured and organized manner; one module width is commonly set to, e. g., about 18 mm (width unit). Devices may have a width of multiples of the module width such as a width of 54 mm for a device with a width of 3 modules. Considering the extended use of normed rails, it is common to provide electronic devices with mounting structures adapted to the normed configurations such as the top-hat rails.

With respect to DIN rails, a plurality of products and modifications are known. For example, there exists a "right angle DIN rail mounting bracket" made of steel by Measurlogic, Inc., which can be screwed on a surface in two orientations to enable mounting one or two meter-units at a top-hat rail section extending orthogonally from the mounting surface.

Furthermore, there exist magnetic support feet for having a metallic rail screwed on, the magnets enabling attaching a top-hat rail to a ferrous metal wall. Moreover, the WM01-K or the WM02-K offered online by ICPDAS (also advertised as "63 mm Magnetic Mounting Kit for 35 mm DIN-rail") provides a row of three magnets between the flanges of a single unit top-hat rail section.

To provide flexibility to the use of electrical cabinets as well as to enable worldwide use of electrical units prepared for being mounted to, e. g., a top-hat rail configurations, there is a need for (easily retrofittable) mounting structures. Moreover, to enable worldwide use of electrical units prepared for being mounted to, e. g., a top-hat rail configuration, there is a need for enabling a worldwide use of rail configurations based on the DIN rails within, e. g., electrical cabinets.

SUMMARY

Thus, the present disclosure is directed, at least in part, to improving or overcoming one or more aspects of prior systems, and, in particular, to providing an efficient and scalable approach for using DIN rails.

Some of the objects may be achieved by a DIN rail unit as recited in the claims.

In a first aspect, the present disclosure is directed to a DIN rail unit 1 that is magnetically fixable to a mounting surface. The DIN rail unit is configured for having mounted thereon an electronic device and comprises a base structure made of a plastic material. The base structure forms an elongated baseplate. The baseplate has in a length direction of the baseplate; a first magnetic fixation section with at least one magnet embedded in the plastic material and covered by a friction increasing layer structure on a back side of the baseplate; a mounting section comprising a first pair of flanges, the flanges extending along a width direction of the baseplate and forming a first DIN rail configuration for having attached thereon the electronic device in a base mounted orientation on a front side of the baseplate; and a second magnetic fixation section with at least one magnet embedded in the plastic material, the magnet covered by a friction increasing layer structure on the back side of the baseplate. The base structure forms further a side mount plate extending from a long side of the baseplate in a normal direction of the baseplate and comprising a second pair of flanges, the flanges extending along the normal direction of the baseplate and forming a second DIN rail configuration for having attached thereon the electronic device in a side mounted orientation in front of the front side of the baseplate.

In a second aspect, a magnetically fixable DIN rail unit for having mounted thereon an electronic device comprises an elongated baseplate made of a plastic material comprising in a length direction of the baseplate a first magnetic fixation section with at least one magnet embedded in the plastic material and covered by a friction increasing layer structure on a back side of the baseplate; a mounting section comprising a first pair of flanges extending along a width direction of the baseplate for forming a DIN rail configuration for having attached thereon the electronic device on a front side of the baseplate; and a second magnetic fixation section with at least one magnet embedded in the plastic material and covered by a friction increasing layer structure on the back side of the baseplate.

In some embodiments of the above summarized magnetically fixable DIN rail units, the at least one magnet of the first magnetic fixation section can be distanced from the closer flange of the first pair of flanges by at least half of, two thirds of or at least once a distance between the flanges of the first pair of flanges, or by at least 25 mm for a top-hat rail configuration or 10 mm for a miniaturized top-hat rail configuration of the first DIN rail configuration.

In some embodiments of the above summarized magnetically fixable DIN rail units, the at least one magnet of the second magnetic fixation section can be distanced from the closer flange of the first pair of flanges by at least half of, two thirds of or at least once a distance between the flanges of the first pair of flanges, or by at least 25 mm for the first DIN rail configuration being configures as a top-hat rail configuration or 10 mm for the first DIN rail configuration being configures as a miniaturized top-hat rail configuration.

In some embodiments of the above summarized magnetically fixable DIN rail units, a first opening or first recess section can be formed in the baseplate between a first flange of the first pair of flanges and the first magnetic fixation section. In addition or alternatively, a second opening or second recess section can be formed in the baseplate between a second flange of the first pair of flanges and the second magnetic fixation section. Moreover, a pair of side bars can extend along the length direction connecting the first magnetic fixation section, the mounting section, and the second magnetic fixation section. Then the side mount plate can extend from one side bar of the pair of side bars. Furthermore, a third opening or third recess section can be formed in the baseplate between the flanges of the first pair of flanges. In addition, at least one of the first recess section, the second recess section, and the third recess section can be configured in depth to have insertable therein a portion of a mounting side surface of the electronic device, if the electronic device is mounted in the base mounted orientation.

In some embodiments of the above summarized magnetically fixable DIN rail units, the DIN rail unit can be configured mirror symmetric with respect to a symmetry line extending centrally between the flanges of the first pair of flanges.

In some embodiments of the above summarized magnetically fixable DIN rail units that include a side mount plate, the flanges of the first pair of flanges and the flanges of the second pair of flanges can run/extend under 90 degrees with respect to each other such that the base mounted orientation is rotated with respect to the side mounted orientation by 90 degrees.

In some embodiments of the above summarized magnetically fixable DIN rail units that include a side mount plate, the flanges of the first pair of flanges and the flanges of the second pair of flanges can run/extend pairwise at a same length position of the length direction of the baseplate.

In some embodiments of the above summarized magnetically fixable DIN rail units, at least one of the first magnetic fixation section or the second magnetic fixation section can comprise a sequence of at least two magnets in the width direction.

In some embodiments of the above summarized magnetically fixable DIN rail units, at least one flange of the first pair of flanges or the second pair of flanges can comprise at least one end stop for limiting a movement of a mounted electronic device along a flange.

In some embodiments of the above summarized magnetically fixable DIN rail units, the at least one flange of the first pair of flanges or the second pair of flanges can comprise a pair of end stops for limiting a movement of a mounted electronic device, and in-between the end stops of the pair of end stops, the flange can provide a notch for receiving a fixing clamp of a mounted electronic device.

In some embodiments of the above summarized magnetically fixable DIN rail units, the baseplate can have a front surface on the front side and a back surface on the back side, and the flanges of the first pair of flanges can be positioned in the normal direction such that a portion of a mounting side surface of a mounted device can be positioned between the front surface and the back surface.

In some embodiments of the above summarized magnetically fixable DIN rail units, the flanges of the first pair of flanges or the second pair of flanges can extend in the width direction over at least 8 mm or at least 11 mm, and can be separated in the length direction by at least 25 mm for the DIN rail configuration being a top-hat rail configuration.

In some embodiments of the above summarized magnetically fixable DIN rail units, the baseplate can have a thickness in the range from 4 mm to 8 mm such as 6 mm.

In some embodiments of the above summarized magnetically fixable DIN rail units that include a side mount plate, the side mount plate can have an inner surface and an outer surface, and the flanges of the second pair of flanges can extend between the inner surface and the outer surface in the normal direction.

In some embodiments of the above summarized magnetically fixable DIN rail units, at least one of the first magnetic fixation section, the mounting section, and the second magnetic fixation section can comprise at least one through hole for a screw connection.

In some embodiments of the above summarized magnetically fixable DIN rail units, at least one of the first DIN rail mount and the second DIN rail mount can be configured with respect to a flange geometry with flanges extending in length direction towards the closer one of the first magnetic fixation section and the second magnetic fixation section. For example, the flanges can be configured in line with a top-hat rail configuration according to the Standard IEC/EN 60715.

In some embodiments of the above summarized magnetically fixable DIN rail units, at least one of the first DIN rail mount and the second DIN rail mount can be configured with respect to a flange geometry with flanges extending in length direction away from the closer one of the first magnetic fixation section and the second magnetic fixation section. For example, the flanges can be configured in line with a C-section rail configuration or a G-section rail configuration of the Standard IEC/EN 60715.

Thus, in one aspect the invention is generally based on fixing magnetically an electronic device within a cabinet and to support the magnetic fixation with a double-sided adhesive tape (as an example of a friction increasing layer), for example, to suppress sliding of the unit along the wall. Further exemplary means to increase the friction between the mounting wall and the magnets are rubber layers or plastic layers that can be applied as friction increasing layers on the magnet(s) such as a rubberized magnet. The friction increasing layer may cover the complete magnet, its mounting surface or a portion thereof. Alternatively, the friction increasing layer may extend at least partly onto the back surface of the baseplate.

The magnets and the friction increasing layer are positioned at opposite sides, e. g., above and below, of the electronic device and thereby ensure a sufficient strength of the mounting with respect to a tensile force downwards and/or with respect to rotating/twisting force along the mounting wall. In light of the distance between the magnets and the to be mounted electronic device, unwanted disturbance of the electronic device caused by the magnetic field of the magnets can be avoided.

In another aspect, the invention is generally based on increasing the flexibility for mounting and positioning an electronical unit via the magnetic mounting arrangement and providing two mount configurations, e. g., DIN rail mounting structures. In a compact design based on a plastic base structure, a base mounted orientation and a side mounted orientation are possible for mounting the electronic device in two orthogonal orientations. Optionally and depending on the mount configuration, for each orientation two inverse/opposite orientations may be possible. Thereby, a large flexibility can be given for positioning-due to the magnetic fixing—and orienting—due to the available mounting at the baseplate (base mounted orientation) or at the side mount plate (side mounted orientation)—an electronic device in a cabinet.

As the magnets are embedded within the plastic material and arranged such that they cannot be touched once mounted, there is no requirement with respect to grounding the top-hat rail unit/electronic device. In some embodiments, the magnets may slightly extend (e. g., 0.3 mm) beyond the back surface of the baseplate. The magnets may be glued to the baseplate, preferably be fixed stronger to the baseplate than the attachment to a metal wall generated by the double-sided adhesive tape.

For example, the top-hat rail unit is implemented by a symmetric baseplate, which allows being attached to a wall (for example, a back wall or a side wall of a sheet metal cabinet) magnetically, and a side mount plate extending orthogonally from the baseplate. The baseplate and the side mount plate each provide for a top-hat rail for attaching a device. In particular due to the angled provision of a side mount plate, mounting an electronic device at a side wall of the cabinet becomes easily possible, even under restricted special conditions.

The herein disclosed concepts are specifically suitable for top-hat rail units used for mounting, in general, light weight electrical components in an electrical installation's cabinet. Therefore, as an exemplary DIN rail, the drawings illustrate the inventive concepts for top-hat rail-based snap-on configurations. However, the skilled person will acknowledge that various of the aspects and concepts discussed herein are equally applicable to any type of DIN rail snap-on connections.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings:

FIGS. 3A-3D are perspective views of the exemplary top-hat rail unit having an electronic device mounted thereon in a second position.

DETAILED DESCRIPTION

Figure 1A:
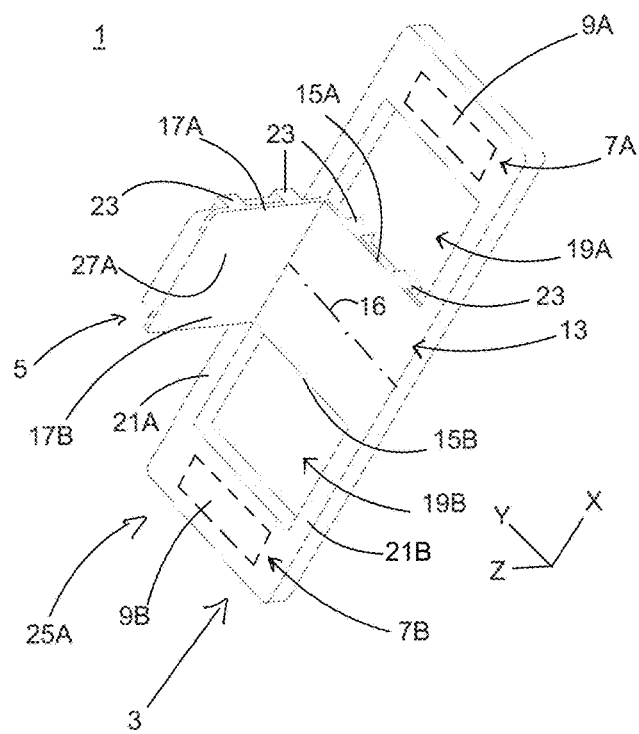
FIGS. 1A-1C are perspective views of an exemplary top-hat rail unit for mounting electronic devices thereon.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure is based in part on the realization by the inventors that the prior art magnetic mounting concept of a top-hat rail section using centrally arranged magnets are prone to instability as there is only limited space available for the magnets in-between the flanges of the top-hat rail section. Moreover, the central position of the magnets with respect to the mounted top-hat rail section makes the set-up prone to rotation once a larger electronic unit is attached to the magnetically held top-hat rail section.

Moreover, the inventors realized that—in particular, for restricted space conditions—the flexibility for mounting and positioning an electronical unit can be improved by providing a magnetic mounting arrangement, which is less susceptible to rotation, in combination with a configuration that enables side face and back face mounting within a single DIN rail mounting structure.

Moreover, the inventors realized that a compact configuration of a magnetically mounted DIN rail mount is less susceptible to a tilting force as the center of gravity can be kept closer to the mounting wall, for example. The proposed baseplate concept can provide a minimal (rather small) distance between the mounted device and the mounting wall.

Figure 1B:
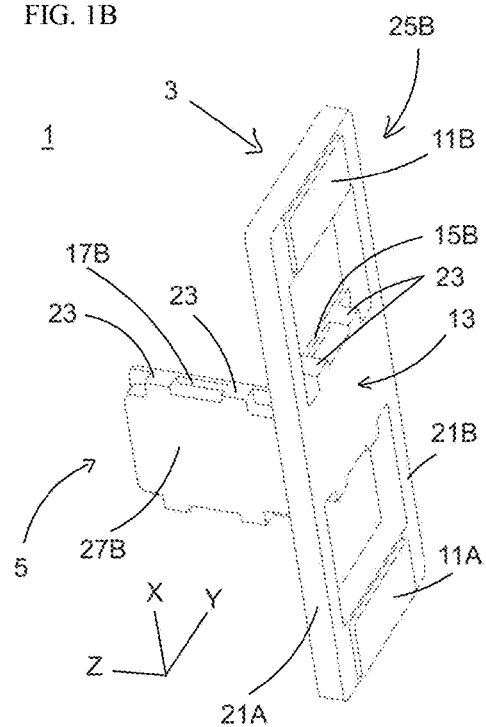
Figure 1C:
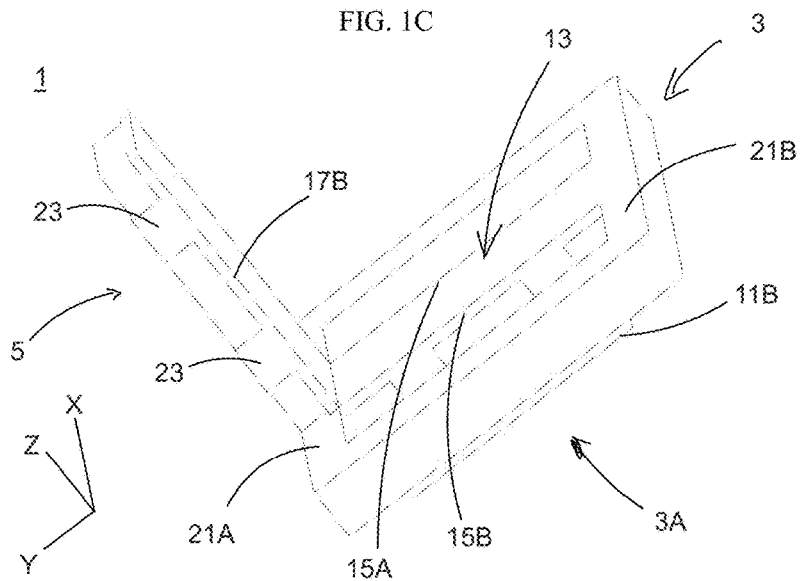

FIG. 1A-1C show 3D-views of an exemplary embodiment of a top-hat rail unit 1 that can be magnetically fixed to a sheet metal wall of, for example, a main electrical service panel. The top-hat rail unit 1 is configured for having mounted thereon an electronic device and specifically provides two mounting options for attaching the electronic device in two orientations (a base mounted orientation and a side mounted orientation) as illustrated in connection with FIGS. 2A-2D and 3A-3D.

The top-hat rail unit 1 comprises a base structure made of a plastic material. The base structure includes an elongated baseplate 3 and a side mount plate 5. The elongated baseplate 3 is made of the plastic material and is structured in a length direction X of the baseplate 3 in several sections;

a first magnetic fixation section 7A with at least one magnet 9A embedded in the plastic material and covered by a double-sided adhesive tape 11A on a back side 3A of the baseplate 3;

a mounting section 13 comprising a first pair of flanges 15A, 15B extending along a width direction Y of the baseplate 3 and forming a first top-hat rail that is configured for having attached thereon the electronic device in the base mounted orientation; and a second magnetic fixation section 7B with at least one magnet 9B embedded in the plastic material and covered by a double-sided adhesive tape 11B on the back side 3A of the baseplate 3.

The mounting section 13 is configured as a first top-hat rail mount for attaching the electronic device in a first orientation as illustrated in FIGS. 3A-3D.

The side mount plate 5 of the base structure is made of the plastic material and extends from a long side of the baseplate 3 in, for example, a normal direction Z of the baseplate 3. The side mount plate 5 provides a second pair of flanges 17A, 17B extending along the normal direction Z of the baseplate 3 and forms a second top-hat rail that is configured for having attached thereon the electronic device.

The side mount plate 5 is configured as a second top-hat rail mount for attaching the electronic device in the side mounted orientation as illustrated in FIGS. 2A-2D.

The magnets 9A, 9B of the first/second magnetic fixation section 7A, 7B is distanced from the respective closer one of the flanges 15A, 15B of the first pair of flanges by more than the distance between the flanges 15A, 15B of the first pair of flanges. The required distance reduces the risk for tilting the top-hat rail unit 1 (reduced tilt moment) once the electronic device is mounted. Generally, a distance of at least half the distance between the flanges 15A, 15B or at least two thirds the distance between the flanges 15A, 15B or at least once the distance between the flanges 15A, 15B or by at least 25 mm or 10 mm provides such a stabilization of the magnetic fixation. The total length of the baseplate 3 can be, for example, 100 mm to 150 mm, usually longer than the respective size of the to be mounted electronic device (e. g., up to about 90 mm for top-hat rail mounted electronic devices).

The base structure is preferably made of a single piece of plastic. The plastic material of the base structure may be, for example, classified under UL 94 such as in line with the material classification V-0.

The magnets 9A, 9B are embedded in the plastic material such that there is no electrical/physical contact possible in the mounted configuration. As the base structure is made of a plastic material, there is also no electric connection/short cut possible between a mounted electronic device and a sheet metal wall of a main electrical service panel, for example. Accordingly, electrically insulated mounting of the electronic device can be ensured.

The additional adhesive tape contributes to fixing the top-hat rail unit at the predefined position and counteracts any sliding of the top-hat rail unit having mounted thereon an electronic device, which could be caused by the weight of the mounted device. Thus, the combination of the magnetic fixation and the adhesive tape provides sufficient long-term installation of electronic devices.

As one can further see in FIG. 1A, the top-hat rail unit 1 can be implemented mirror symmetric with respect to a symmetry line (dash-dotted line 16) extending centrally between the flanges 15A, 15B of the first pair of flanges. Such a degree of symmetry allows magnetically fixing the top-hat rail unit 1 onto a metallic surface under identical conditions with the side mount plate 5 either at the left side or at the right side of the baseplate 3. In addition, due the symmetric configuration of the provided top-hat rails, the electronic device can be mounted in two orientations, respectively, at each of the top-hat rails, further increasing the flexibility for positioning the electronic device.

In the exemplary embodiment, the flanges 15A, 15B of the first pair of flanges and the flanges 17A, 17B of the second pair of flanges run under 90 degrees with respect to each other. Accordingly, the base mounted orientation is rotated with respect to the side mounted orientation by 90 degrees. Moreover, the flanges 15A, 15B and the flanges 17A, 17B can run pairwise at the same length position of the length direction X of the baseplate 3. Then, the position of a mounted electronic device is, with respect to the length direction X, identical in the base mounting orientation and the side mounting orientation.

Referring again to FIGS. 1A-1C, a first opening 19A is formed in the baseplate 3 between the first flange 15A of the first pair of flanges and the first magnetic fixation section 7A. A second opening 19B is formed in the baseplate 3 between the second flange 15B of the first pair of flanges and the second magnetic fixation section 7B. Along the length direction X, a pair of side bars 21A, 21B connects the first magnetic fixation section 7A, the mounting section 13, and the second magnetic fixation section 7B. The side mount plate 5 extends from side bar 21A of the pair of side bars. Optionally, similar to the openings 19A, 19B, a third opening (not shown) can be formed in the baseplate 3 between the flanges 15A, 15B, for example, to reduce the weight of the baseplate 3.

Alternatively to the opening 19A and/or the opening 19B, a respective recess section can be provided within the baseplate 3, to increase stability, if needed. Preferably, the respective recess section can be configured to have insertable therein a portion of a mounting side surface of the electronic device, if the electronic device is mounted in the base mounting orientation.

Alternatively to a single magnet provided in a magnetic fixation sections 7A, 7B, a sequence of at least two magnets can be provided that are preferably aligned in the width direction Y.

For limiting a movement of a mounted electronic device, at least one flange 15A, 15B, 17A, 17B can comprise at least one end stop 23 for limiting a movement of a mounted electronic device along the flange. Exemplarily, respective pairs of end stops 23 are shown in the figures. In between a pair of end stops 23, a clamp or other locking means of an electronic device can interact with the respective intermediate flange portion.

With respect to the implementation of the top-hat rails, the same can be configured with respect to a flange geometry according to one of the standards for top-hat rails, e. g., with flanges extending in the length direction X towards the closer one of the first magnetic fixation section 7A and the second magnetic fixation section 7B. Exemplary Standards include the Standard IEC/EN 60715.

With respect to the implementation of the top-hat rail in the baseplate 3, the baseplate 3 has a front surface 25A (viewable in FIG. 1A) and a back surface 25B (viewable in FIG. 1B). The flanges 15A, 15B are positioned in the normal direction Z such that a portion of a mounting side surface of a mounted device can be positioned between the front surface 25A and the back surface 25B. Thereby, the electronic device is preferably moved as close as possible towards the mounting wall and similarly towards the back surface 25B. This can reduce a tilting moment onto the top-hat rail unit as the center of gravity is close to the mounting wall at which the top-hat rail unit is magnetically fixed. The baseplate 3 has, for example, a thickness in the range from 4 mm to 8 mm. The thickness of the side mount plate 5 may be comparable or, in some embodiments, even less. Generally for the mounting at the side mount plate 5, there is no wall to interfere with the snap-on mechanism (while the mounting wall could in principle interfere with the snap-on mechanism of the baseplate). Thus, while the thickness of the baseplate 3 needs to accommodate smooth operation of the snap-on mechanism to mount and demount the electronic device on the first top-hat rail configuration, such a limitation is not given for the second top-hat rail configuration of the side mount plate 5.

The flanges extend, for example, over at least 8 mm or at least 11 mm in width direction Y, and are separated by at least 35 mm in length direction X. An exemplary thickness of the flanges (in normal direction for flanges 15A, 15B, and in width direction Y for flanges 17A, 17B) can be about 1 mm.

With respect to the implement of the respective top-hat rail in the side mount plate 5, the side mount plate 5 has an inner surface 27A (viewable in FIG. 1A) and an outer surface 27B (viewable in FIG. 1B). In the exemplary embodiment shown in FIGS. 1A-1C, the flanges 17A, 17B extend between the inner surface 27A and the outer surface 27B.

In the illustrated exemplary embodiment shown in FIGS. 1A-1C, the flanges 17A, 17B form an extension of the inner surface 27A of the side mount plate 5 as well as the front surface 25A of the baseplate 3. Alternatively, the flanges may be slightly raised or lowered with respect to the inner surface 27A or the front surface 25A, respectively.

Like in the embodiment described in connection with FIG. 4, the first magnetic fixation section 7A, the mounting section 13, and/or the second magnetic fixation section 7B can have one or more through holes (not shown) for a screw connection, in case a non-magnetically fixation is intended.

FIGS. 2A-2D and 3A-3D illustrate how an exemplary electronic device 100 can be mounted at the magnetically fixable top-hat rail unit 1 in two different orientations, a side mounting orientation and a base mounting orientation. The side mounting orientation relates to mounting the top-hat rail unit to the side mount plate 5, while the base mounting orientation relates to mounting the top-hat rail unit to the baseplate 3. Generally, the electronic device 100 can be mounted to any one of the first top-hat rail (FIGS. 3A-3D) or the second top-hat rail (FIGS. 2A-2D).

Figure 2A:
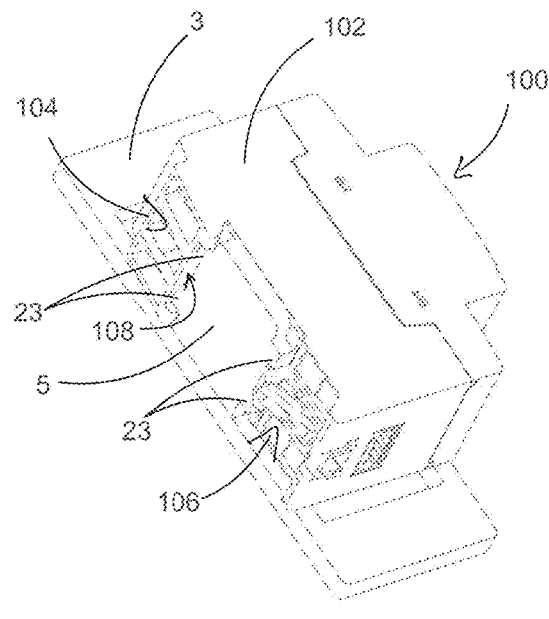
FIGS. 2A-2D are perspective views of the exemplary top-hat rail unit having an electronic device mounted thereon in a first position.
Figure 2B:
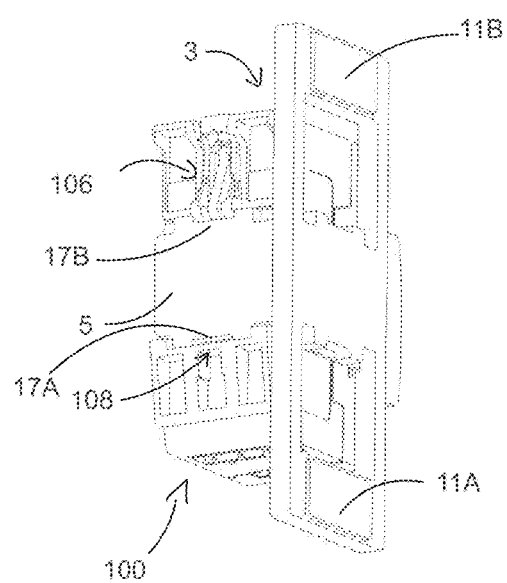
Figure 2C:
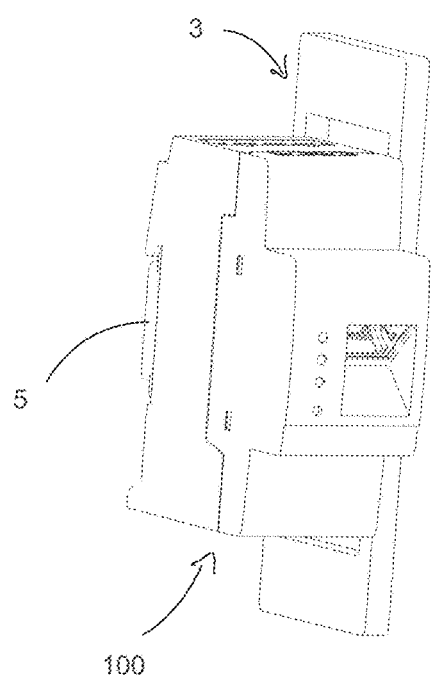

The electronic device 100 has a housing 102 with a rear side 104 (forming the mounting side surface of the electronic device 100), the rear side 104 providing a releasable latching device 106 (see, for example, FIGS. 2A and 2B).

Snap-locked mechanisms for interacting with a top-hat rail are well known in various embodiments. Exemplarily, the latching device 106 shown in the drawings is configured as a releasable clamp. The clamp interacts with a flange as a snap-lock mechanism. Counteracting means, e. g. a protrusion 108 (see, for example, FIGS. 2A and 2B), lock behind an opposing flange of the top-hat rail.

As shown in FIGS. 2A and 2B, the latching device 106 interacts with flange 17B of the top-hat rail portion of the side mount plate 5 in between end stops 23, while the protrusion 108 interacts with flange 17A of the top-hat rail portion of the side mount plate 5.

Depending on the length of the top-hat rails provided at the baseplate 3 or the side mount plate 5, one or several modules/electronic devices of different or the same width may be attachable to the respective top-hat rail. For example, the width of the baseplate 3 may allow two (or more) units to be mounted to the baseplate 3, and, e. g., two (or more) pairs of end stops are provided. Similarly, the width of the side mount plate 5 may allow two (or more) units to be mounted to the side mount plate 5, and, e. g., two (or more) pairs of end stops 23 are provided.

Due to the symmetry of the design of the top-hat rails, the electronic device 100 can be mounted at the top-hat rail unit 1, for example, with the one or the other end pointing up or down.

Figure 2D:
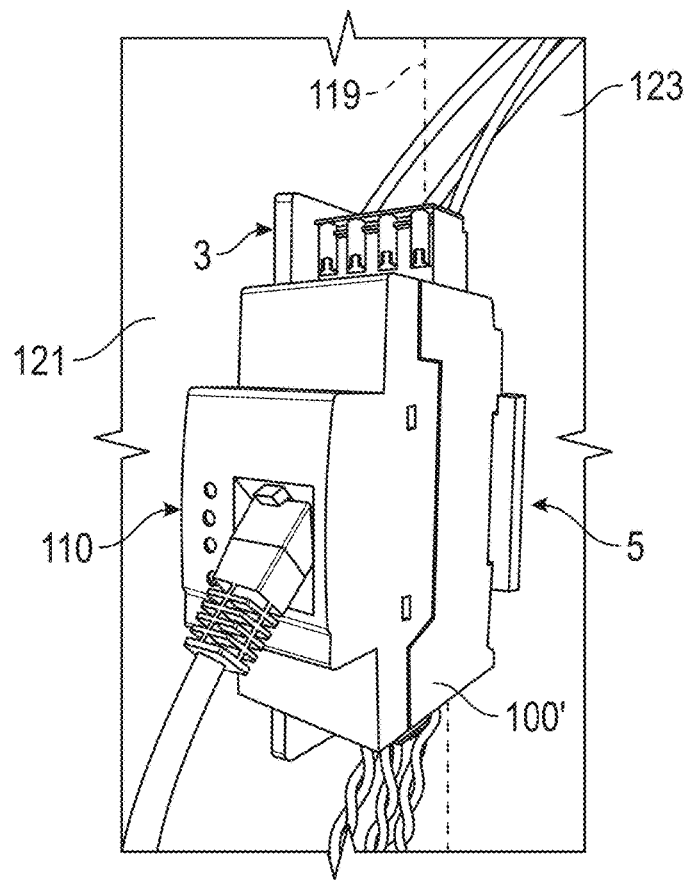

FIG. 2D shows a picture of an electronic device 100' mounted at an inner corner (indicated by a dashed line 119) of a sheet metal cabinet via a top-hat rail unit. Specifically, the electronic device 100' is mounted to the side mount plate 5 of the top-hat rail unit, and the baseplate 3 of the top-hat rail unit is magnetically fixed to a side wall 121 of the cabinet. As one can see, the electronic device 100' is smoothly positioned close to a back wall 123 of the cabinet and close to the inner corner of the cabinet. The selected orientation provides smooth access to an interface side 110 of the electronic device 100'.

As one can see, when mounted in the side mounting orientation, a side of the housing of the electronic device 100' extends along the baseplate 3. Preferably, the distance between the baseplate 3 and the electronic device's side is as small as possible, thereby decreasing the tilting moment acting onto the baseplate 3.

Referring to FIG. 3A-3D, for the base mounting orientation, the latching device 106 can alternatively interact with flange 15B of the top-hat rail portion of the baseplate 3 in between end stops 23, while the protrusion 108 interacts with flange 15A of the top-hat rail portion of the baseplate 3. Accordingly, the rear side of the electronic device 100' reaches into the openings 19A, 19B (see FIG. 3B) such that the distance between the mounting wall of the cabinet and the electronic device's rear side is preferably as small as possible, thereby decreasing the tilting moment acting onto the baseplate 3.

As one can see, in the side mounting orientation, a side of the housing of the electronic device 100' extends next to and parallel to the side mount plate 5.

FIG. 3D shows a picture of an electronic device 100' mounted at an inner corner (indicated by dashed line 119) of a sheet metal cabinet via a top-hat rail unit. Specifically, the electronic device 100' is mounted to the baseplate 3 of the top-hat rail unit, which is magnetically fixed to a back wall 123 of the cabinet. As one can see, the electronic device 100' is smoothly positioned at the inner corner of the cabinet providing smooth access to the interface side 100 of the electronic device 100'.

Figure 4:
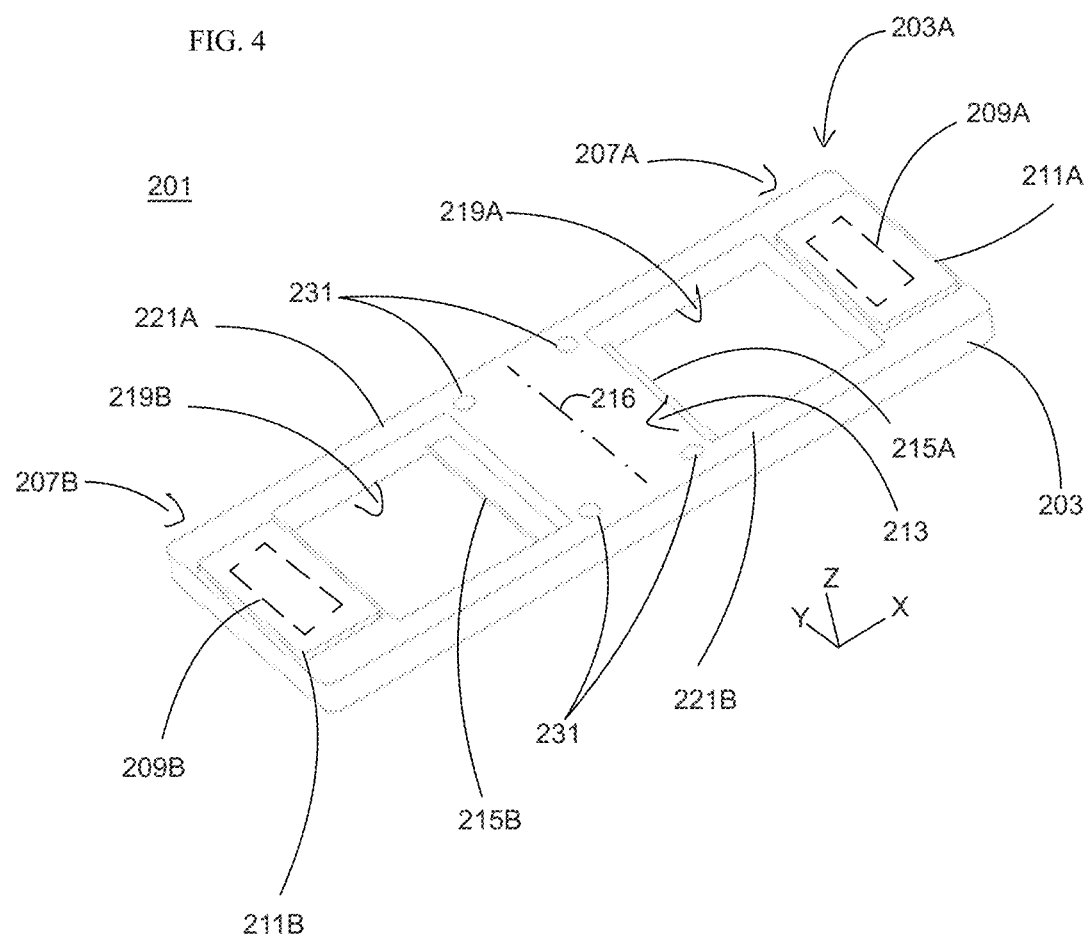
FIG. 4 is a perspective view of another embodiment of an exemplary top-hat rail unit.

Referring to FIG. 4, another top-hat rail unit 201 is illustrated. Similar to the embodiment described in connection with FIGS. 2A-2C, an elongated baseplate 203 made of plastic material includes, in length direction X, several sections:

- a first magnetic fixation section 207A with at least one magnet 209A embedded in the plastic material and covered by a double-sided adhesive tape 211A on a back side 203A of the baseplate 203;
- a mounting section 213 comprising a first pair of flanges 215A, 215B extending along a width direction Y of the baseplate 203 and forming a top-hat rail that is configured for having attached thereon the electronic device; and
- a second magnetic fixation section 207B with at least one magnet 209B embedded in the plastic material and covered by a double-sided adhesive tape 211B on the back side 203A of the baseplate 203. The plastic material of the baseplate 203 may be, for example, classified under UL 94 such as the material classification V-0.

The magnets 209A, 209B are embedded in the plastic material such that there is no electrical/physical contact possible in the mounted configuration. As the base structure is made of a plastic material, there is also no electric connection/short cut possible between a mounted electronic device and a sheet metal wall of a main electrical service panel, for example. Accordingly, electrically insulated mounting of the electronic device can be ensured.

The additional adhesive tapes 211A, 211B contributes to fixing the top-hat rail unit at the predefined position and counteracts any sliding of the top-hat rail unit having mounted thereon an electronic device, which could be caused by the weight of the mounted device. Thus, the combination of the magnetic fixation with the magnets 209A, 209B and the adhesive tape 211A, 211B provides sufficient long-term installation of electronic devices.

A first opening 219A is formed in the baseplate 203 between the first flange 215A of the pair of flanges and the first magnetic fixation section 207A. A second opening 219B is formed in the baseplate 203 between the second flange 215B of the first pair of flanges and the second magnetic fixation section 207B. Along the length direction X, a pair of side bars 221A, 221B connects the first magnetic fixation section 207A, the mounting section 213, and the second magnetic fixation section 207B. Optionally, similar to the openings 219A, 219B, a third opening (not shown) can be formed in the baseplate 203 between the flanges 215A, 215B, for example, to reduce the weight.

In FIG. 4, through holes 231 are exemplarily provided in the mounting section 213 for an additional optional screw connection, in case a non-magnetically fixation is intended.

With respect to further details on the configuration of baseplate 203, it is referred to the above description with respect to the baseplate 3, which is equally applicable to the top-hat rail unit 201 shown in FIG. 4. See for example, the aspects of symmetry with respect to a (dash-dotted) symmetry line 216.

The herein disclosed concepts of DIN rail units can be magnetically attached in and, thus, securely installed within a sheet metal housing such as a main service panel. Specifically, for known snap-on connection of electronic devices to a, e. g., top-hat rail, the snap-on connection counterpart is provided within a plastic baseplate, and the baseplate is attachable to, for example, a sheet metal wall with magnetic fixation. As disclosed herein, the friction of the mounted top-hat rail device can be increased by a double-sided adhesive tape, a rubber layer, or any friction increasing layer.

Various advantages of the herein disclosed DIN (e. g., top-hat, G-section or c-section) rail units relate to the flexibility of mounting an electronic device in a sheet metal cabinet without the need of cutting/drilling into a housing. Referring to the pressure onto the adhesive tape due to the magnetic force generated by the magnets, sufficient fixation may be provided even within a dirty environment or an environment being subject to large temperature and humidity, which in principle might counteract the adhesive action of the adhesive tape. A high degree of symmetry of implementation of the DIN rail units may further increase the mounting flexibility. The operation of devices equipped with two DIN rail configurations as snap-on connections and the magnetically fixed top-hat rail unit simplifies the installation and exchange of electronic devices. Moreover, based on the herein disclosed concepts, the implementation is scalable with respect to the number of units that can be mounted in one or both of the orientations such as one unit or two to four units of the same or different width.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Although the preferred embodiments of this invention have been described herein, improvements and modifications may be incorporated without departing from the scope of the following claims.

The invention claimed is:

1. A magnetically fixable DIN rail unit for having mounted thereon an electronic device comprising:
   a base structure made of a plastic material forming
      an elongated baseplate that has in a length direction of the baseplate;
         a first magnetic fixation section with at least one magnet embedded in the plastic material and covered by a friction increasing layer structure on a back side of the baseplate;
         a mounting section comprising a first pair of flanges, the flanges extending along a width direction of the baseplate and forming a first DIN rail configuration for having attached thereon the electronic device in a base mounted orientation on a front side of the baseplate; and
         a second magnetic fixation section with at least one magnet embedded in the plastic material, the magnet covered by a friction increasing layer structure on the back side of the baseplate; and
      a side mount plate extending from a long side of the baseplate in a normal direction of the baseplate and comprising a second pair of flanges, the flanges extending along the normal direction of the baseplate and forming a second DIN rail configuration for having attached thereon the electronic device in a side mounted orientation in front of the front side of the baseplate.

2. The magnetically fixable DIN rail unit of claim 1, wherein the at least one magnet of the first magnetic fixation section is distanced from the closer flange of the first pair of flanges by at least half of, two thirds of or at least once a distance between the flanges of the first pair of flanges, or by at least 25 mm for a top-hat rail configuration or 10 mm for a miniaturized top-hat rail configuration of the first DIN rail configuration.

3. The magnetically fixable DIN rail unit of claim 1, wherein the at least one magnet of the second magnetic fixation section is distanced from the closer flange of the first pair of flanges by at least half of, two thirds of or at least once a distance between the flanges of the first pair of flanges, or by at least 25 mm for the first DIN rail configuration being configures as a top-hat rail configuration or 10 mm for the first DIN rail configuration being configures as a miniaturized top-hat rail configuration.

4. The magnetically fixable DIN rail unit of claim 1, wherein at least one of
   a first opening or first recess section is formed in the baseplate between a first flange of the first pair of flanges and the first magnetic fixation section, and
   a second opening or second recess section is formed in the baseplate between a second flange of the first pair of flanges and the second magnetic fixation section; and
wherein
   a pair of side bars extends along the length direction connecting the first magnetic fixation section, the mounting section, and the second magnetic fixation section, and the side mount plate extends from one side bar of the pair of side bars.

5. The magnetically fixable DIN rail unit of claim 4, wherein
a third opening or third recess section is formed in the baseplate between the flanges of the first pair of flanges.

6. The magnetically fixable DIN rail unit of claim 4, wherein
at least one of the first recess section or the second recess section is configured in depth to have insertable therein a portion of a mounting side surface of the electronic device, if the electronic device is mounted in the base mounted orientation.

7. The magnetically fixable DIN rail unit of claim 1, wherein the DIN rail unit is mirror symmetric with respect to a symmetry line extending centrally between the flanges of the first pair of flanges.

8. The magnetically fixable DIN rail unit of claim 1, wherein the flanges of the first pair of flanges and the flanges of the second pair of flanges run under 90 degrees with respect to each other such that the base mounted orientation is rotated with respect to the side mounted orientation by 90 degrees.

9. The magnetically fixable DIN rail unit of claim 1, wherein the flanges of the first pair of flanges and the flanges of the second pair of flanges run pairwise at a same length position of the length direction of the baseplate.

10. The magnetically fixable DIN rail unit of claim 1, wherein at least one of the first magnetic fixation section or the second magnetic fixation section comprises a sequence of at least two magnets in the width direction.

11. The magnetically fixable DIN rail unit of claim 1, wherein at least one flange of the first pair of flanges or the second pair of flanges comprises at least one end stop for limiting a movement of a mounted electronic device along a flange.

12. The magnetically fixable DIN rail unit of claim 1, wherein at least one flange of the first pair of flanges or the second pair of flanges comprises a pair of end stops for limiting a movement of a mounted electronic device, and in-between the end stops of the pair of end stops, the flange provides a notch for receiving a fixing clamp of a mounted electronic device.

13. The magnetically fixable DIN rail unit of claim 1, wherein the baseplate has a front surface on the front side and a back surface on the back side, and the flanges of the first pair of flanges are positioned in the normal direction such that a portion of a mounting side surface of a mounted device is positioned between the front surface and the back surface.

14. The magnetically fixable DIN rail unit of claim 1, wherein the flanges of the first pair of flanges or the second pair of flanges extend in the width direction over at least 8 mm or at least 11 mm, and are separated in the length direction by at least 25 mm for the DIN rail configuration being a top-hat rail configuration.

15. The magnetically fixable DIN rail unit of claim 1, wherein the baseplate has a thickness in the range from 4 mm to 8 mm such as 6 mm.

16. The magnetically fixable DIN rail unit of claim 1, wherein the side mount plate has an inner surface and an outer surface, and the flanges of the second pair of flanges extend between the inner surface and the outer surface in the normal direction.

17. The magnetically fixable DIN rail unit of claim 1, wherein at least one of the first magnetic fixation section, the mounting section, and the second magnetic fixation section comprises at least one through hole for a screw connection.

18. The magnetically fixable DIN rail unit of claim 1, wherein at least one of the first DIN rail mount and the second DIN rail mount are configured with respect to a flange geometry with flanges extending in length direction towards the closer one of the first magnetic fixation section and the second magnetic fixation section, such as within a top-hat rail configuration of the Standard IEC/EN 60715.

19. The magnetically fixable DIN rail unit of claim 1, wherein at least one of the first DIN rail mount and the second DIN rail mount are configured with respect to a flange geometry with flanges extending in length direction away from the closer one of the first magnetic fixation section and the second magnetic fixation section, such as within a C-section rail configuration or a G-section rail configuration of the Standard IEC/EN 60715.

20. A magnetically fixable DIN rail unit for having mounted thereon an electronic device comprising:
an elongated baseplate made of a plastic material comprising in a length direction of the baseplate;
a first magnetic fixation section with at least one magnet embedded in the plastic material and covered by a friction increasing layer structure on a back side of the baseplate;
a mounting section comprising a first pair of flanges extending along a width direction of the baseplate for forming a DIN rail configuration for having attached thereon the electronic device on a front side of the baseplate; and
a second magnetic fixation section with at least one magnet embedded in the plastic material and covered by a friction increasing layer structure on the back side of the baseplate.

* * * * *